US009583948B2

(12) United States Patent
Mueck et al.

(10) Patent No.: US 9,583,948 B2
(45) Date of Patent: Feb. 28, 2017

(54) ISOLATED DIGITAL TRANSMISSION WITH IMPROVED EMI IMMUNITY

(71) Applicant: Analog Devices, Inc., Norwood, MA (US)

(72) Inventors: Michael Mueck, Andover, MA (US); Adam Glibbery, Reading (GB)

(73) Assignee: Analog Devices, Inc., Norwood, MA (US)

( * ) Notice: Subject to any disclaimer, the term of this patent is extended or adjusted under 35 U.S.C. 154(b) by 642 days.

(21) Appl. No.: 13/662,100

(22) Filed: Oct. 26, 2012

(65) Prior Publication Data

US 2014/0119082 A1    May 1, 2014

(51) Int. Cl.
*H02J 5/00* (2016.01)
*H04L 25/02* (2006.01)
*H02M 1/44* (2007.01)

(52) U.S. Cl.
CPC .......... *H02J 5/005* (2013.01); *H04L 25/0266* (2013.01); *H02M 1/44* (2013.01)

(58) Field of Classification Search
CPC .. H02M 7/42; H02M 7/44; H02M 1/44; H02J 5/005; H04L 25/0266
See application file for complete search history.

(56) References Cited

U.S. PATENT DOCUMENTS

| | | | |
|---|---|---|---|
| 3,851,098 A | 11/1974 | Pingault | |
| 4,709,318 A * | 11/1987 | Gephart | H02J 9/062 307/66 |
| 5,515,257 A * | 5/1996 | Ishii | H02M 1/4225 323/282 |
| 5,757,626 A * | 5/1998 | Jovanovic et al. | 363/21.04 |
| 6,069,801 A * | 5/2000 | Hodge et al. | 363/21.02 |
| 6,836,414 B1 * | 12/2004 | Batarseh et al. | 363/17 |
| 7,777,459 B2 * | 8/2010 | Williams | 323/266 |
| 7,880,447 B1 * | 2/2011 | Lin et al. | 320/166 |
| 8,159,092 B2 * | 4/2012 | Luthi | H02J 9/005 307/130 |
| 8,723,491 B2 * | 5/2014 | Giuliano | 323/266 |

(Continued)

FOREIGN PATENT DOCUMENTS

| | | |
|---|---|---|
| CN | 102231600 A | 11/2011 |
| EP | 0 250 035 A1 | 12/1987 |
| FR | 2 199 920 A5 | 4/1974 |

OTHER PUBLICATIONS

Extended European Search Report mailed Apr. 12, 2016 for Application No. 13 189 782.9.

*Primary Examiner* — Zeev V Kitov
(74) *Attorney, Agent, or Firm* — Wolf, Greenfield & Sacks, P.C.

(57) ABSTRACT

Embodiments of the present invention may provide a circuit. The circuit may include a primary side, a secondary side, and an isolated energy transfer device electrically isolating the primary side and the secondary side. The primary side may include a first energy storage device coupled to a power source, a control system coupled to the first energy storage device for power, a second energy storage device, and a coupling system, coupled to the control system, to selectively couple the second energy storage device to the power source in a first phase and to selectively couple the second energy storage device to the primary side of the isolated energy transfer device during a second phase.

22 Claims, 6 Drawing Sheets

(56) References Cited

U.S. PATENT DOCUMENTS

| | | | |
|---|---|---|---|
| 2004/0267322 A1* | 12/2004 | Kavounas | A61N 1/3975 607/5 |
| 2009/0286476 A1* | 11/2009 | Toncich | G06K 7/0008 455/41.1 |
| 2011/0242868 A1 | 10/2011 | Gray et al. | |
| 2012/0062203 A1 | 3/2012 | Kim | |
| 2014/0167661 A1* | 6/2014 | van der Merwe | 318/400.3 |
| 2015/0008756 A1* | 1/2015 | Lee | H02J 17/00 307/104 |

* cited by examiner

ISOLATED DIGITAL TRANSMISSION WITH IMPROVED EMI IMMUNITY

BACKGROUND

The present invention relates to energy or data transmission system with improved electromagnetic interference (EMI) immunity.

In a variety of environments, signals must be transmitted between diverse sources and circuitry that uses those signals while maintaining electrical (i.e., galvanic) isolation between the sources and the using circuitry. Electrical isolation can prevent extraneous transient signals, including common-mode transients, from inadvertently being processed as status or control information. Also, among other known objectives and uses, electrical isolation is used to protect the equipment from shock hazards, or to permit the equipment on each side of an isolation barrier to be operated at a different supply voltage. For example, isolation is typically needed between microcontrollers and devices or transducers that use microcontroller output signals.

Coil (or transformer) based isolators are widely used signal transformers in which a primary winding and a secondary winding are inductively coupled. Conventional transformers, however, transmit pulses by switching one terminal of the inductor on and off to a power supply voltage. Thus, in the conventional transformers, the signaling current is an integral part of the supply current and any electromagnetic interference on the power supply voltage severely affects the signal transmission. Therefore, the inventors perceive a need in the art for an isolated digital signal transmission mechanism with improved EMI immunity.

DETAILED DESCRIPTION

Embodiments of the present invention may provide a circuit. The circuit may include a primary side, a secondary side, and an isolated energy transfer device electrically isolating the primary side and the secondary side. The primary side may include a first energy storage device coupled to a power source, a control system coupled to the first energy storage device for power, a second energy storage device, and a coupling system, coupled to the control system, to selectively couple the second energy storage device to the power source in a first phase and to selectively couple the second energy storage device to the primary side of the isolated energy transfer device during a second phase.

Embodiments of the present invention may provide a method for transmitting data across an isolation barrier. The method may include coupling a first energy storage device to a power source and supplying power to a control system using the first energy storage device. The method may also include responsive to at least one control signal generated by the control system, coupling a second energy storage device to the power source during a charge phase, and coupling the second energy storage device to a primary side of an electrically isolating energy transfer device during a dump phase.

Figure 1:
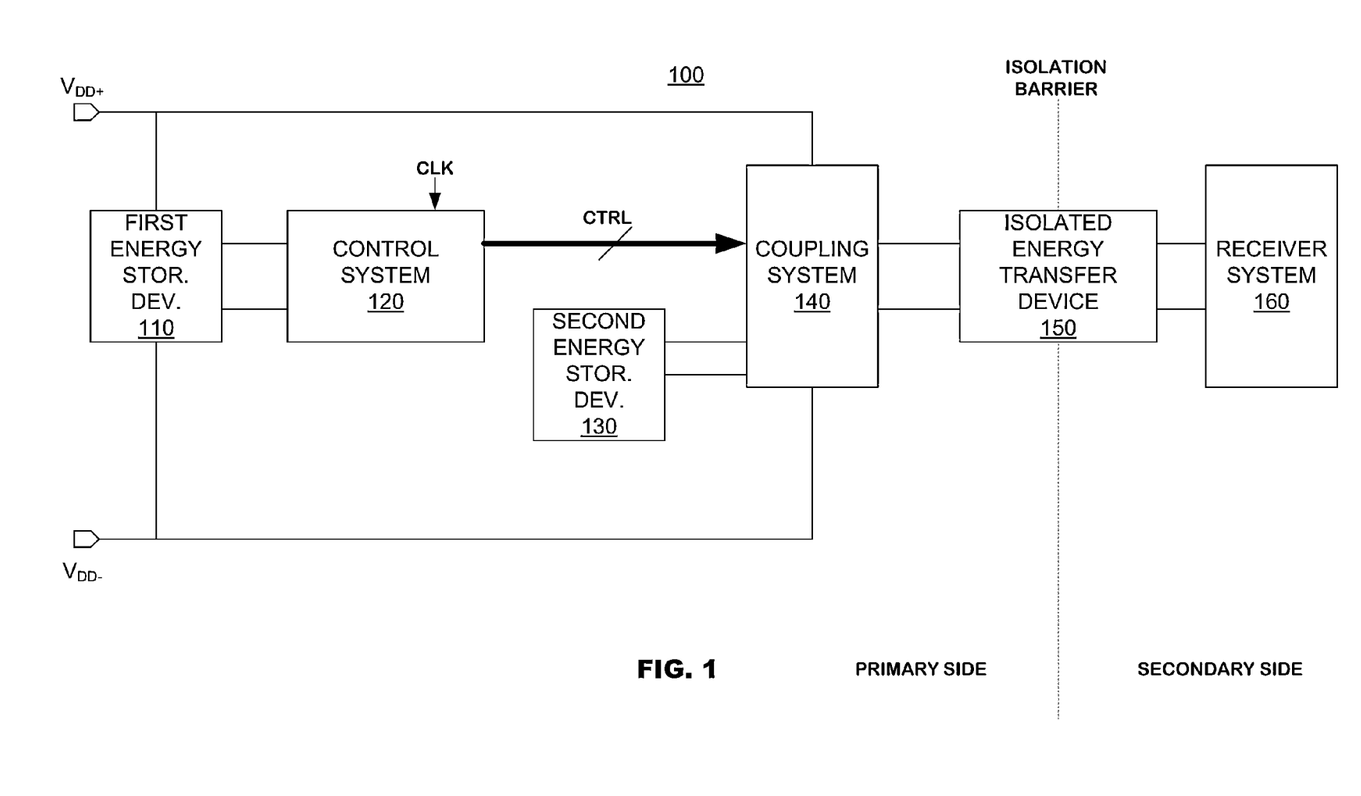
FIG. 1 illustrates a circuit according to an embodiment of the present invention.

FIG. 1 illustrates a circuit 100 according to an embodiment of the present invention. The circuit 100 may include a primary side and a secondary side separated by an isolation barrier. The circuit 100 may be used for energy transmission from the primary side to the secondary side, and the energy transmission may correspond to data transmission.

The circuit 100 may include a first energy storage device 110, a control system 120, a second energy storage device 130, and a coupling system 140 provided on the primary side. An isolated energy transfer device 150 may be provided in between the primary side and the secondary side, which are separated by the isolation barrier. The circuit 100 may further include a receiver system 160 provided on the secondary side. The primary side may be coupled to a power source with a high voltage source $V_{DD+}$ and a low voltage source $V_{DD-}$ (collectively $V_{DD}$). In an embodiment, the low voltage source $V_{DD-}$ may be provided with a ground connection. In an embodiment, the power source $V_{DD}$ may be an external power source to the primary side components. For example, the primary side may be provided on an integrated circuit and may include a pin coupled to the power source $V_{DD}$. Alternatively, the power source $V_{DD}$ may be a local power generator that receives input signals transmitted across the isolation barrier. The configuration of the power source $V_{DD}$ is immaterial unless described below. For purposes of the present disclosure, it is sufficient to note the power source $V_{DD}$ is subject to noise effects that can impair operations of the primary side.

Further, the first energy storage device 110 may be coupled to the power source $V_{DD}$. The first energy storage device 110 may include capacitor(s), inductor(s) and/or other suitable energy storage components. In an embodiment, the first energy storage device 110 may be provided as a filter and, hence the first energy storage device 110 may store a filtered charge from the power source $V_{DD}$.

The first energy storage device 110 may be coupled to the control system 120, and the first energy storage device 110 may provide power to the control system 120 for control system operations. In an embodiment, the control system 120 may include logic circuitry components. The control system 120 may receive control input(s) such as a clock input. Responsive to the control input(s), the control system 120 may generate control signal(s) to control the operations of the coupling system 140. By having the control system 120 powered by the first energy storage device 110, the control system 120 may improve its EMI immunity because the stored charge in the first energy storage device 110 may be immune to charge spikes and/or other EMI related effects present in the power source $V_{DD}$.

The coupling system 140 may be provided with switch(es), amplifier(s), current source(s), other suitable electrical coupling components and/or a combination thereof. Different embodiments of coupling systems are described below in further detail. The coupling system 140 may be coupled to the power source $V_{DD}$, the second energy storage device 130, and the isolated energy transfer device 150. The energy transfer device 150 may provide a transmission medium for energy or data across the isolation barrier and may include primary terminals on the primary side and secondary terminals on the secondary side.

The circuit 100 may operate in two phases—a charge phase and a dump phase—based on control signal(s) generated by the control system 120. In a charge phase, no energy or data is transmitted across the isolated energy transfer device 150. In the charge phase, the coupling system 140, responsive to control signal(s) from the control system 120, may couple the power source $V_{DD}$ to the second energy storage device 130, which may include capacitor(s), inductor(s) and/or other suitable energy storage components. Thus, in the charge phase, the second energy storage device 130 be charged by the power source $V_{DD}$.

In a dump phase, the coupling system 140, responsive to control signal(s) from the control system 120, may decouple the power source $V_{DD}$ from the second energy storage device 130. Also, in the dump phase, the coupling system 140 may couple the second energy storage device 130, which may hold a charge from the prior charge phase, to the primary terminal of the isolated energy system 150 in order to transmit energy or data across to the secondary side.

The energy or data may be transmitted across the isolated energy transfer device 150 to the secondary side to the receiver system 160. After the energy or data are transmitted across to the secondary side, the primary side may then re-enter the charge phase.

Therefore, the circuit 100 may provide improved EMI immunity for at least two reasons. First, energy or data transmissions across isolated energy transfer device 150 may be powered by the stored charge in the second energy storage device 130, which is not subject to noise effects or other EMI related irregularities as compared to the power source $V_{DD}$, which can be subject to noise and other EMI related irregularities. Second, the control system 120 may be powered by the first energy storage device 110 and thus the control system 120 operations, including energy transfer operations using coupling system 140, may be further immunized from noise and other EMI related irregularities that can be found in the power source $V_{DD}$.

Figure 2:
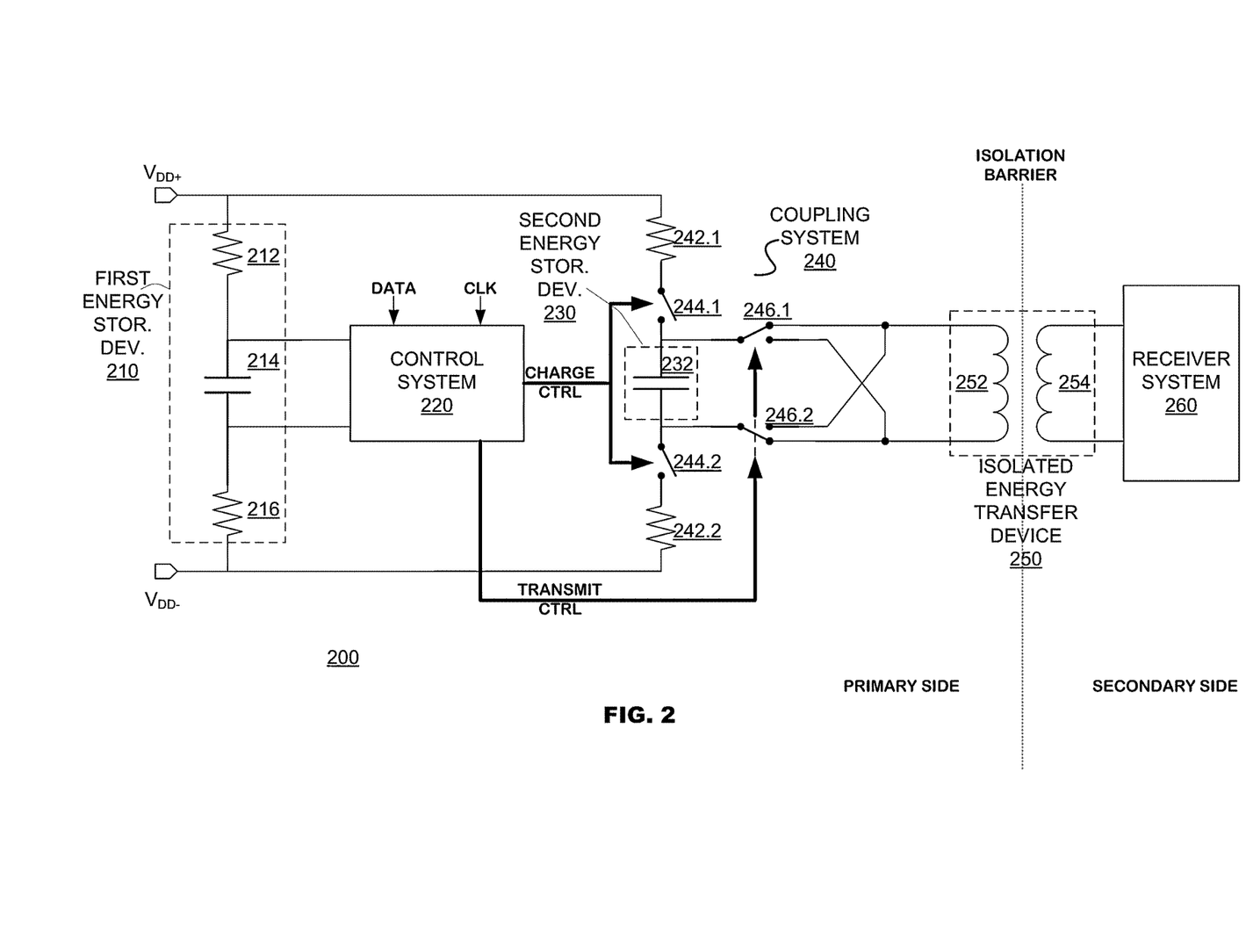
FIG. 2 illustrates a circuit according to an embodiment of the present invention.

FIG. 2 illustrates a circuit 200 according to an embodiment of the present invention. The circuit 200 may include a primary side and a secondary side separated by an isolation barrier.

The circuit 200 may be used for energy transmission from the primary side to the secondary side, and the energy transmission may correspond to data transmission. The circuit 200 may include a first energy storage device 210, a control system 220, a second energy storage device 230, and a coupling system 240 provided on the primary side. An isolated energy transfer device 250 may be provided in between the primary side and the secondary side, which are separated by the isolation barrier. The isolated energy device 250 may provided as a transformer with a primary winding 252 and a secondary winding 254. The circuit 200 may further include a receiver system 260 coupled to the secondary winding 254 provided on the secondary side.

The primary side may be coupled to a power source with a high voltage source $V_{DD+}$ and a low voltage source $V_{DD-}$ (collectively $V_{DD}$). In an embodiment, the low voltage source $V_{DD-}$ may be provided with a ground connection. In an embodiment, the power source $V_{DD}$ may be an external power source to the primary side components. For example, the primary side may be provided on an integrated circuit and may include a pin coupled to the power source $V_{DD}$. Alternatively, the power source $V_{DD}$ may be a local power generator that receives input signals transmitted across the isolation barrier. The configuration of the power source $V_{DD}$ is immaterial unless described below. For purposes of the present disclosure, it is sufficient to note the power source $V_{DD}$ is subject to noise effects that can impair operations of the primary side.

Further, the first energy storage device 210 may include resistors 212, 216 and a storage capacitor 214, and may be coupled to the power source $V_{DD}$. In an embodiment, the resistor 212, 216 and the storage capacitor 214 may operate as RC filter and, hence, the storage capacitor 214 may store a filtered charge from the power source $V_{DD}$.

The first energy storage device 210 may be coupled to the control system 220, and the first energy storage device 210 may provide power to the control system 220 for control system operations. For example, the control system 220 may be powered by the filtered charge stored on the storage capacitor 214. In an embodiment, the control system 220 may include logic circuitry components.

The control system 220 may receive control input(s) such as a clock input and a data input. Responsive to the control input(s), the control system 220 may generate control signal(s), such as a charge control signal and a transmit control signal, to control the operations of the coupling system 240. By having the control system 220 powered by the first energy storage device 210, in particular the storage capacitor 214, the control system 220 may improve its EMI immunity because the stored charge in the first energy storage device 210 may be immune to charge spikes and/or other EMI related effects present in the power source $V_{DD}$.

The coupling system 240 may include charge switches 244.1, 244.2 (and resistors 242.1, 242.2) and dumping switches 246.1, 246.2. The charge switches 244.1, 244.2 may selectively couple a charge capacitor 232 in the second energy storage device 230 to the power source $V_{DD}$. The charge capacitor 232 may be provided as a single capacitor as shown in FIG. 2 or, alternatively, may be provided as multiple capacitors. Multiple capacitor embodiments are described below in further detail. The charge switches 244.1, 244.2 operations may be controlled by the charge control signal generated by the control system 220. The dumping switches 244.1, 244.2 may selectively couple the charge capacitor 232 to the primary winding 252. The dumping switches 246.1, 246.2 operations may be controlled by the transmit control signal generated by the control system 220. Hence, the coupling system 240 may be controlled by the control system 220, which again may be powered by the first energy storage device 210.

The second energy storage device 230, the coupling system 240, and the primary winding 252 (collectively referred to as a transmission system) may generate pulse(s) to transmit data across the isolation barrier.

The circuit 200 may operate in two phases—a charge phase and a dump phase—based on control signal(s) generated by the control system 220. In a charge phase, no energy or data may be transmitted across the isolated energy transfer device 250. In other words, no pulses may be transmitted across the primary winding 252. In the charge phase, the charge switches 244.1, 244.2 may be closed responsive to the charge control signal from the control system 220 to couple the power source $V_{DD}$ to the charge capacitor 232. Thus, in the charge phase, the charge capacitor 232 may be charged by the power source $V_{DD}$, and the charge capacitor 232 may store that charge on its plates. Also, the resistors 242.1, 242.2 may form a RC filter with charge capacitor 232, and, consequently, a filtered charge may be stored in the charge capacitor 232. Further, in the charge phase, the charge capacitor 232 may not be coupled to a terminal of the primary winding 252 via the dumping switches 246.1, 246.2 (i.e., the dumping switches 246.1, 246.2 may be open), and, therefore, there may be no data transmission in the charge phase.

In a dump phase, energy or data may be transmitted across the isolated energy transfer device 250. In other words, data pulse(s) may be transmitted across the primary winding 252. In the dump phase, the coupling system 240, responsive to control signal(s) from the control system 220, may de-couple the power source $V_{DD}$ from the second energy storage device 230. For example, the charge switches 244.1, 244.2 may be turned open to de-couple the charge capacitor 232 from the power source $V_{DD}$. Also, in the dump phase, the coupling system 240 may couple the second energy storage device 230, which may hold a charge from the prior charge phase, to the primary terminal of the isolated energy system 250 to transmit energy or data across to the secondary side. For example, dumping switches 246.1, 246.2 may be closed to couple the charged plate of the charge capacitor 234 to the terminal of the primary winding 252 to transmit pulse(s) across the primary winding 254. The dumping switches 246.1, 246.2 may be provided in a bi-polarity arrangement as shown in FIG. 2 or, alternatively, may be provided in a single polarity arrangement. The charge stored on the charge capacitor 232 from the earlier charge phase may provide sufficient charge for the pulse(s) transmission, and, the power source $V_{DD}$ may be decoupled from the transmission system during the pulse(s) transmission. The number of pulses may be based on the data to be transmitted and may be adjustable.

The pulse(s) may be transmitted across the primary winding 252 to the secondary winding 252 on the secondary side. The pulse(s) may then be demodulated by a receiver system 260, coupled to the secondary winding 254, to recover the data. After the pulse(s) are sent from the primary winding 252 to the secondary winding 254, the primary side may then re-enter a charge phase.

In an embodiment, the second energy storage device 230 may include a plurality of capacitors that may be coupled to the power source during the charge phase. For example, the plurality of capacitors may be arranged parallel to each other. In another example, the plurality of capacitors may be arranged in bi-polar manner. Also, the plurality of capacitors may be coupled to the primary winding 254 sequentially during the dump phase to transmit multiple bits of information in the same dump phase.

Again, the circuit 200 may provide improved EMI immunity for at least two reasons. First, energy or data transmissions across isolated energy transfer device 250 may be powered by the stored charge in the second energy storage device 230, which is not subject to noise effects or other EMI related irregularities as compared to the power source $V_{DD}$, which can be subject to noise and other EMI related irregularities. Second, the control system 220 may be powered by the first energy storage device 210 and thus the control system 220 operations, including energy transfer operations using coupling system 240, may be further immunized from noise and other EMI related irregularities that can be found in the power source $V_{DD}$.

Figure 3:
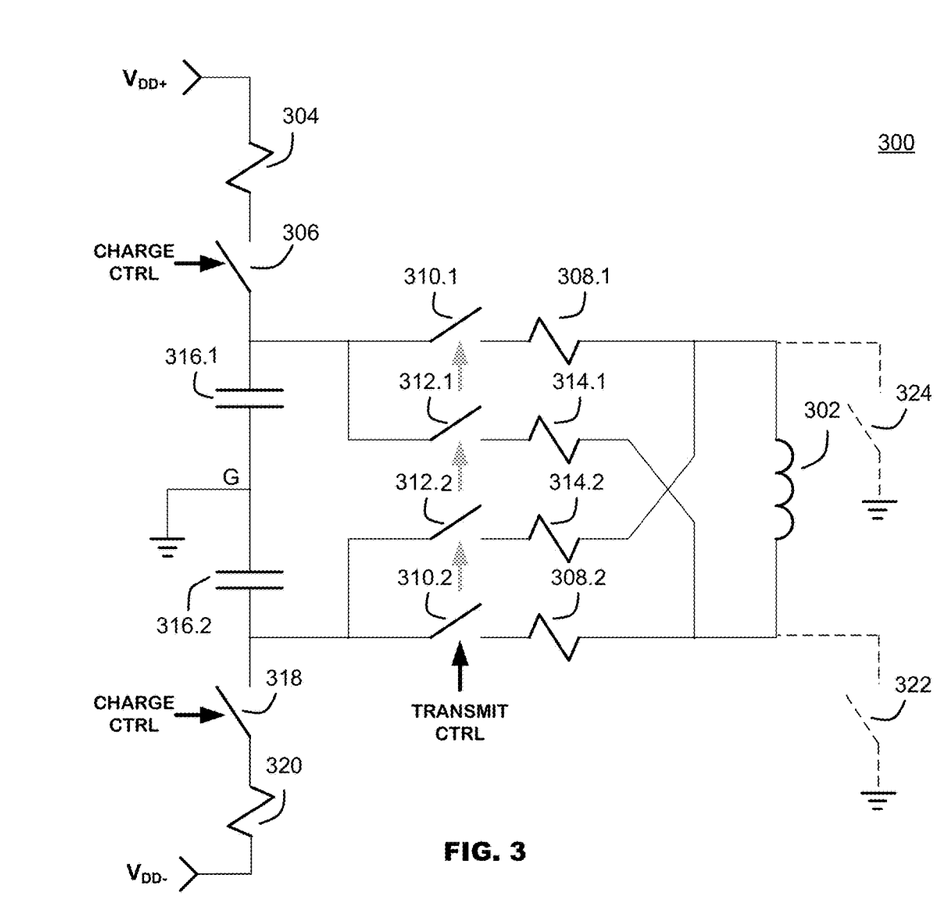
FIG. 3 illustrates a transmission system according to an embodiment of the present invention.

FIG. 3 illustrates a transmission system 300 according to an embodiment of the present invention. In an embodiment, the transmission system 300 may be implemented in the circuits 100 and 200 of FIGS. 1 and 2. The transmission system 300 may comprise a primary winding 302 and a drive circuit for the primary winding 302. The drive circuit may comprise a pair of charge capacitors 316.1 and 316.2 that each has a plate coupled to a common point G. The other plate (e.g., top plate as shown) of the charge capacitor 316.1 may be coupled to a power source $V_{DD}$ via a charge switches 306, 318 and resistors 304, 320. The capacitors 316.1 and 316.2 may be coupled to the primary winding 302 by dumping switches 310.1, 310.2, 312.1 and 312.2, and resistors 308.1, 308.2, 314.1 and 314.2. The transmission system 300 may further comprise optional parking switches 322 and 324 showing in phantom. All switch operations may be controlled by a control system (for example control system 220 of FIG. 2), and in an embodiment, the control system may be powered by a first energy storage device (not shown) as described above in the discussion of FIGS. 1 and 2. Furthermore, one capacitor may be used as the charge capacitor (e.g., one single capacitor 316.1 but no capacitor 316.2); however, two capacitors may provide a common mode to cancel out the electrical charges generated by the transient charge current.

The transmission system 300 may operate in a charge phase and a dump phase. In the charge phase, the charge switches 306 and 318 may be connected. All other switches, including the dumping switches 310.1, 310.2, 312.1 and 312.2 and the parking switches 322 and 324, may all be disconnected. Thus, during the charge phase, the top plate of the capacitor 316.1 may be connected to the power source $V_{DD}$ via the resistor 304 and the capacitor 316.1 to be charged by the power source $V_{DD}$. The charge rate may be determined by the RC constant based on the resistance of the resistor 304 and capacitance of the capacitor 316.1. In an embodiment, the larger the resistance of the resistor 304, the more isolation from the fluctuation or interference on the power supply pin (e.g., $V_{DD}$). In an embodiment, the voltage across the capacitor 316.1 may be a filtered version of the power source.

In the dump phase, one pair of dumping switches, 310.1 and 310.2, or 312.1 and 312.2, may be connected while all other switches, including charge switches 306 and 318, may be disconnected. If the dumping switches 310.1 and 310.2 are connected, the top of the primary winding 302 may be connected to the top plate of the capacitor 316.1 via the resistor 308.1 and the bottom of the primary winding 302 may be connected to the bottom plate of the capacitor 316.2 via the resistor 308.2. Thus, the electrical charges accumulated on the top plate of the capacitor 316.1 may be dumped (redistributed) through the primary wingding 302 to the capacitor 316.2. The dumping of the electrical charge may trigger a signal of a first polarity being sent from the primary winding 302 to a secondary winding, which is not shown.

If the dumping switches 312.1 and 312.2 are connected while all other switches may be disconnected, the top of the primary winding 302 may be connected to the bottom plate of the capacitor 316.2 via the resistor 314.2 and the bottom of the primary winding 202 may be connected to the top plate of the capacitor 216.1 via the resistor 314.1. Thus, the electrical charges accumulated on the top plate of the capacitor 316.1 may be dumped through the primary winding 302 to the bottom plate of the capacitor 316.2. The dumping of the electrical charge may trigger a signal of a second polarity being sent from the primary winding 302 to the secondary winding. The first polarity may be positive and the second polarity may be negative, or vice versa.

In an embodiment, when either pair of the dumping switches (310.1 and 310.2, or 312.1 and 312.2) are connected and all other switches are disconnected, the primary winding 302 and the two capacitors 316.1 and 316.2 may form a resonant LCR circuit. The resonant frequency of the LCR circuit may be decided by a desired signal frequency for signaling across the primary winding 302 to the secondary winding, and the capacitance of the capacitors 316.1 and 316.2 may be set in tandem with the inductance of the primary winding depending on the resonant frequency. The resistance of the resistors in the LCR circuit (308.1 and 308.2, or 314.1 and 314.2) may be set based on the damping requirement for the LC circuit. Thus, the pulse width for signaling may be determined by the LCR circuit characteristics. The transient response of this circuit may come from the initial charge stored on capacitor 316.1, which results in a damped oscillation. The resistance may be set for critical damping so the transient response now has just one overshoot. The point where the voltage reaches zero the first time is the square root of LC ($\sqrt{LC}$) for the critically damped system. For example, a 100 nH coil and a 10 pF capacitor may have a corresponding feature that is ins wide.

If the charge phase is greater than the pulse width then the capacitor 316.1 may be smaller than a filter capacitor used in a conventional filtering scheme by ratio. For example, in a conventional H bridge filtering configuration, in which a terminal of the primary winding is connected to a power supply directly with a filtering capacitor between the terminal and ground, the capacitor may be in of the order hundreds of pF (say, 500 pF) for a 500 MHz signal. Additionally the corner frequency of the transfer of voltage from the external supply to the voltage across the charge cap may be reduced, improving supply immunity.

After the signal is sent from the primary winding 302 to the secondary winding, the connected pair of dumping switches may be disconnected, and the charging switches 306 and 318 may be connected to charge for the next signaling operation (i.e., re-enter charging phase). In an embodiment, at the same time during the charging, the parking switches 320 and 322 may be connected to couple the top and bottom of the primary winding 202 to ground. In an embodiment, the parking switches 320 and 322 may be low impedance switches such that the field may already be dissipated by the switch 308, and the parking switches 322 and 324 may stop currents from being induced in the coil by external transient behavior. In an embodiment, the parking switches 322 and 324 may be resistive (or with additional resistors coupled in the path to the ground) to allow for faster signaling by dissipating the field during the charge phase.

In one or more embodiments, one or more or all switches of the transmission system 300 may be bootstrapped switches with series resistors that provide a linear resistance when turned on.

Figure 4:
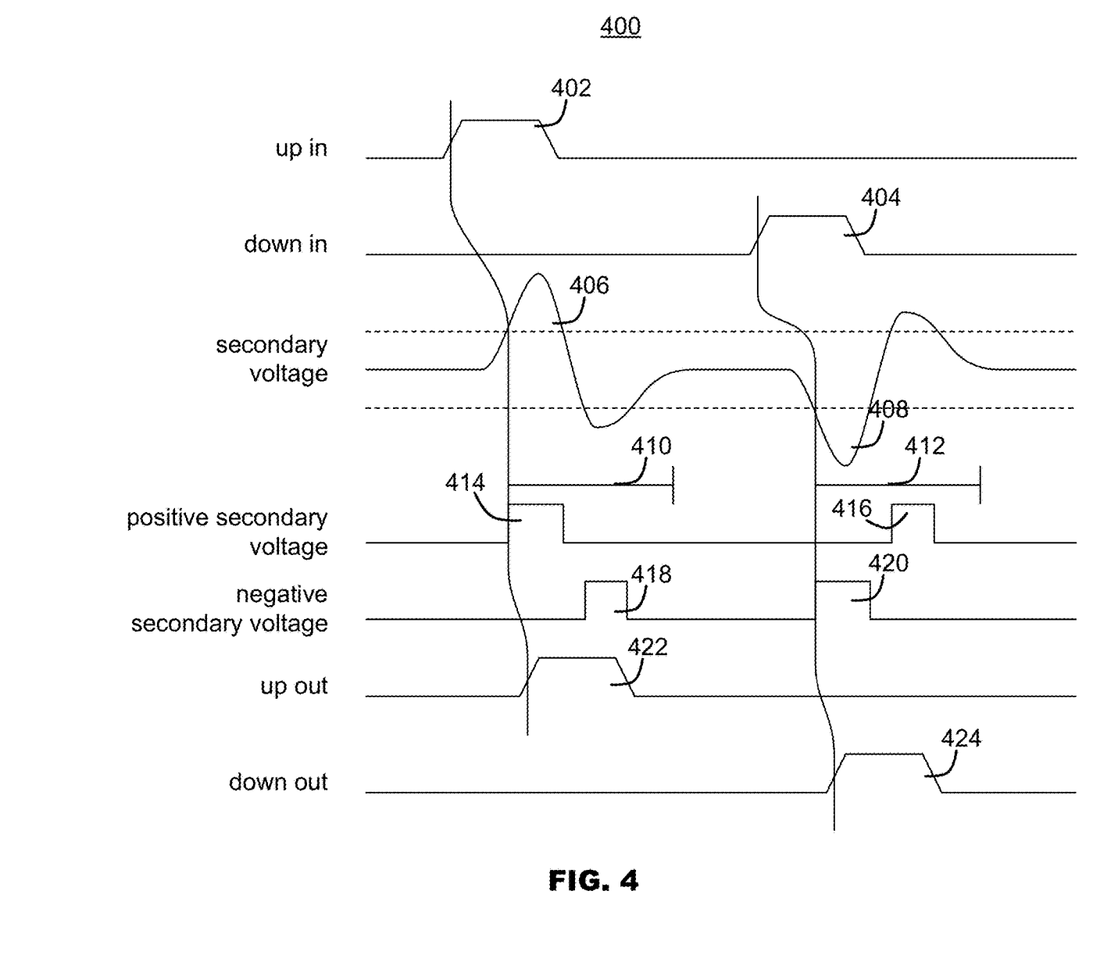
FIG. 4 illustrates signals generated by a transmission system according to an embodiment of the present invention.

FIG. 4 illustrates signals generated by a transmission system according to an embodiment of the present invention. The signals 402 and 404 may represent two input signals. Although they are marked as "up in" and "down in" respectively, the polarities of the input signals are for illustration only. The secondary voltage signals 406 and 408 may represent the EM voltage in the primary and secondary windings of a transformer according to an embodiment of the present invention. For example, the secondary voltage signal 406 may represent the EM voltage of the primary winding 302 in a discharge dump phase when the dumping switches 310.1 and 310.2 are connected, and the secondary voltage signal 408 may represent the EM voltage of the primary winding 302 in a discharge dump phase when the dumping switches 312.1 and 312.2 are connected. In an embodiment, the secondary voltage signals 406 and 408 may be triggered by the rising edges of the input signals 402 and 404.

Both secondary voltage signals 406 and 408 may include a head portion and a tail portion. The head portion of the secondary voltage signal 406 that exceeds a certain positive threshold may correspond to a positive secondary voltage 414 and the tail portion of the secondary voltage signal 406 that is lower than a certain negative threshold may correspond to a negative secondary voltage 418. The head portion of the secondary voltage signal 408 that is lower than the certain negative threshold may correspond to a negative secondary voltage 414 and the tail portion of the secondary voltage signal 406 that exceeds the certain positive threshold may correspond to a positive secondary voltage 416. The certain positive and negative thresholds may be configured according to preference to reject interferers. In an embodiment, the rising or falling edge of a secondary voltage signal may trigger a one shot that defines a time window to capture the transmitted signals. For example, the rising edge of the secondary voltage signal 406 may trigger a time window 410 and the falling edge of the secondary voltage signal 408 may trigger a time window 412. The rising edge of the positive secondary voltage 414 and the falling edge of the negative secondary voltage 418 may be within the time window 410, and these two edges may be used to construct the output signal 422 that may correspond to the input signal 402. The rising edge of the negative secondary voltage 420 and the falling edge of the positive secondary voltage 416 may be within the time window 412, and these two edges may be used to construct the output signal 424 that may correspond to the input signal 404. The point where the secondary voltage passes zero and goes to the opposite polarity is the square root of LC ($\sqrt{LC}$).

Figure 5A:
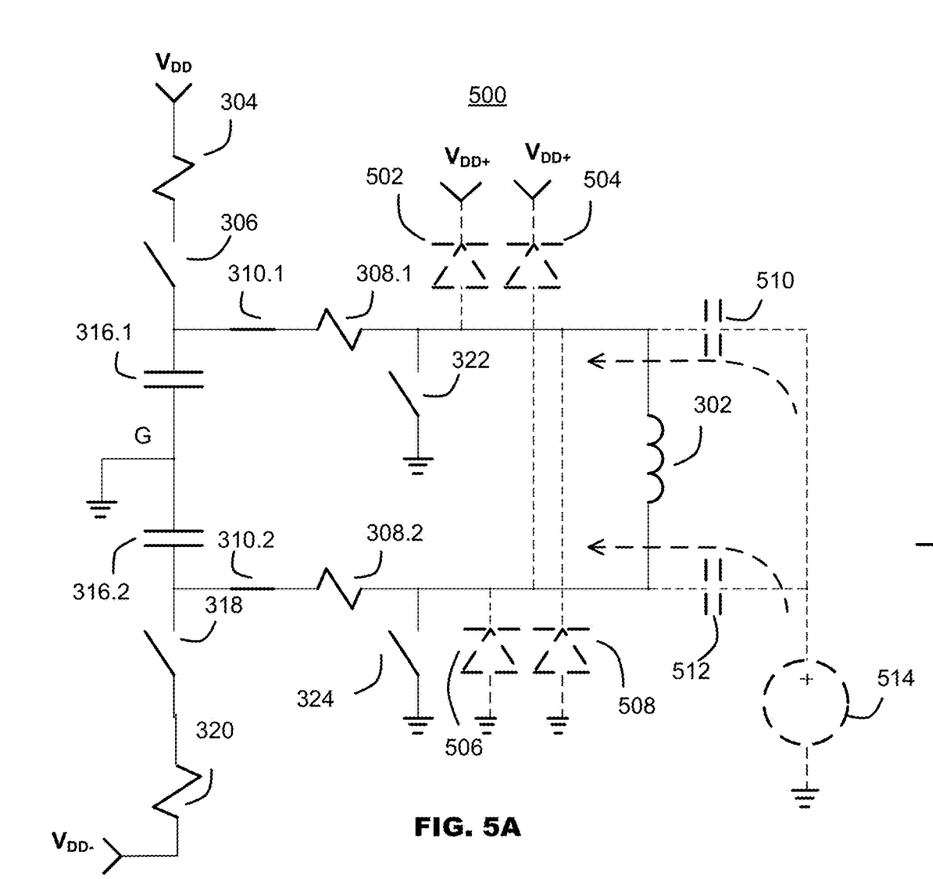
FIG. 5A illustrates transient charges affecting the transmission system of FIG. 3 according to one embodiment of the present invention.

FIG. 5A illustrates transient charges affecting the transmission system 300 of FIG. 3 according to one embodiment of the present invention. The transmission system 500 in FIG. 5A are identical to the transmission system 300 in FIG. 3, with the exception of the switches 312.1 and 312.2 and resistors 314.1 and 314.2 being omitted for simplicity. In addition to the components already illustrated and described in FIG. 3 and corresponding description, the transformer 500 in FIG. 5A also illustrates parasitic diodes 502, 504, 506 and 508, parasitic capacitors 510 and 512 and a parasitic charge current source 514. The diodes 502, 504, 506 and 508 illustrate how the top and bottom of the primary winding are electrically separated from the power supply and ground, respectively.

FIG. 5A also includes two dashed arrows indicating the electrical currents generated during a transient stage. The transient currents may charge the top plate of the capacitor 316.1 and the bottom plate of the capacitor 316.2, respectively. The capacitors 510 and 512 are not explicit capacitors but represent inherent parasitic capacitance between the primary winding 302 and its corresponding secondary winding (not shown). The coil of the primary winding 302 may have about half of its capacitance between each terminal, so the capacitors 510 and 512 are coupled between each terminal and the voltage source 514 that causes the currents to flow through capacitors 510 and 512. In an embodiment, the capacitors 316.1 and 316.2 may have substantially identical capacitance, so the transient charge currents may only generate a common mode.

Figure 5B:
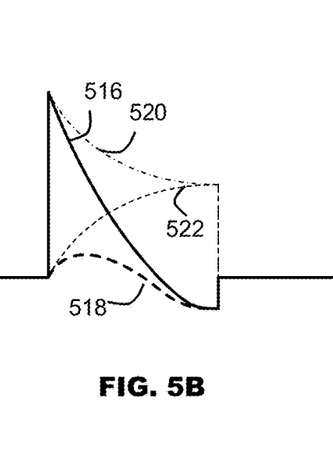
FIG. 5B illustrates signals generated in a primary winding of the transformer of FIG. 3 according to an embodiment of the present invention.

FIG. 5B illustrates the effects of transient charge currents in the primary winding 302. The signal 516 may represent the voltage at the top of the primary winding 302 and the signal 518 may represent the voltage at the bottom of the primary winding 302, with the transient charge currents. The signal 520 may represent the voltage at the top of the primary winding 302 and the signal 522 may represent the voltage at the bottom of the primary winding 302, without the transient charge currents. As shown in FIG. 5B, the signal 520 starts from its peak (when the top terminal of the primary winding 302 is connected to the charged side of the capacitor) and goes down, while the signal 522 starts from ground (when the bottom terminal of the primary winding 302 is connected to the un-charged side of the capacitor) and goes up. In the end, the two signals 520 and 522 may reach the same level in the middle between the peak and ground. In comparison, because the two capacitors 316.1 and 316.2 each having one side grounded, the transient charge currents only cause the signals 516 and 518 to shift away from 520 and 522 but still maintain the same differential between the top and bottom of the primary winding 302. In an embodiment, the parasitic charge current source 514 may be a current sink that draws positive electrical charges away from the capacitors 316.1 and 316.2 so the signals 516 and 518 may be below the ground level in the curves.

In an embodiment, the capacitors 316.1 and 316.2 may need to be large enough that none of the parasitic diodes switches on before a pulse being transmitted is finished. That is, if the capacitors 316.1 and 316.2 are small, the voltages on these capacitors may change fast and the parasitic diodes may be switched on. For example, if the capacitors 316.1 and 316.2 are correctly sized as the field has been mostly dissipated by the time the parasitic diodes 506 and 508 switch on. To correctly size the capacitors, capacitor 510/512 and capacitor 316.1/316.2 may form a voltage divider in which case capacitor 316 may be made large enough that the scaled version of our voltage waveform on the voltage source 514 will not forward bias any of the parasitic diodes.

In the case where a transient large enough to switch on the diodes was applied to the voltage source 514, once the pulse is completely transmitted there is no differential signal at the two terminals of the primary winding 302, both terminals will be equal to the diode voltage. With no transient, both terminals will be equal to Vdd/2. When there is no pulse, the parking switches 323 and 324 may be switched on to ground the terminals of the primary winding 302. Timing of switching may not be important and transient may have no effect outside of the pulse.

Figure 6:
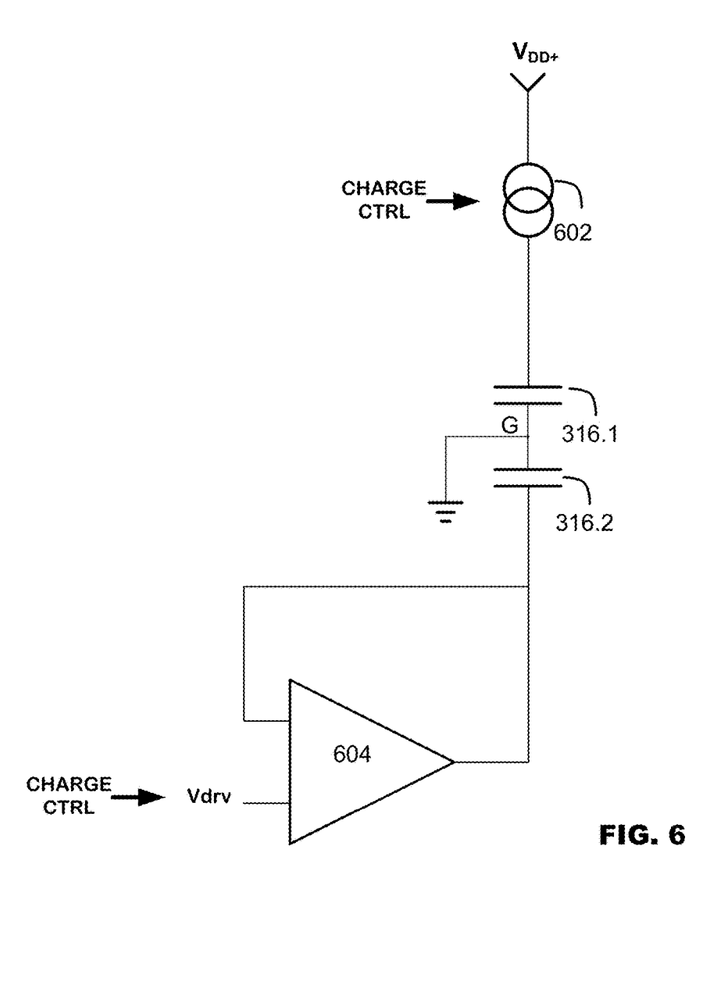
FIG. 6 illustrates a drive buffer for a transmission system according to an embodiment of the present invention.

FIG. 6 illustrates a drive buffer 600 for a transmission system according to an embodiment of the present invention. The drive buffer circuit 600 may comprise a drive current source 602 to control charging of the top plate of the charge capacitor 316.1 and a drive amplifier 604 to control charging of the bottom plate of the charge capacitor 316.2. The current source 602 may be implemented using components known in the art and may be controlled by a control system (not shown) as described above in the discussion of FIGS. 1 and 2. The drive amplifier 604 may be driven by a control signal Vdrv and may be implemented using components known in the art. Further, the drive amplifier 604 may also be controlled by a control system (not shown) as described above in the discussion of FIGS. 1 and 2.

In an embodiment, the top plate of the capacitor 316.1 may be charged to a voltage level of the power source $V_{DD}$ and the bottom plate of the capacitor 316.2 may be charged to a voltage level of a control signal Vdrv. Thus, at the beginning of the dump phase, the voltage differential between the top and bottom of the primary winding 302 of may be $V_{DD}$-Vdrv.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A circuit for transmitting data across an isolation barrier, comprising:
   a primary side,
   a secondary side, and
   an energy transfer device electrically isolating the primary side and the secondary side and including a primary coil,
   wherein the primary side comprises:
     first and second energy storage devices,
     a control system coupled to the first energy storage device for power and configured to receive a data signal,
     at least one charge switch selectively coupling a power source to the second energy storage device, and
     at least one dumping switch selectively coupling the second energy storage device to the primary coil,
   wherein the control system is configured to control the at least one charge switch and the at least one dumping switch such that energy is selectively transmitted from the second energy storage device to the secondary side that corresponds to the data signal.

2. The circuit of claim 1, wherein the energy transfer device comprises a transformer circuit with a primary winding on the primary side and a secondary winding on the secondary side.

3. The circuit of claim 1, wherein the first energy storage device comprises at least one capacitor.

4. The circuit of claim 3, wherein the first energy storage device is coupled to the power source via at least one resistor, and wherein the control system is powered by the first energy storage device regardless of the states of the at least one charge switch and the at least one dumping switch.

5. The circuit of claim 1, wherein:
   the at least one charge switch and the at least one dumping switch are included in a coupling system configured to selectively couple the second energy storage device to the power source during a charge phase and to selectively couple the second energy storage device to the primary coil of the energy transfer device during a dump phase; and
   the control system is configured to cause the coupling system to couple the second energy storage device to the power source during the charge phase, and to couple the second energy storage device to the primary coil of the energy transfer device during the dump phase.

6. The circuit of claim 5, wherein the control system is further configured to cause the coupling system to selectively couple the second energy storage device to the primary coil of the energy transfer device in a bi-polar manner.

7. The circuit of claim 5, wherein the control system is further configured to cause the coupling system to selectively couple the second energy storage device to the power source in a bi-polar manner.

8. The circuit of claim 5, wherein the coupling system comprises a current source to selectively couple the second energy storage device to the power source.

9. The circuit of claim 5, wherein the coupling system comprises an amplifier to selectively couple the second energy storage device to the power source.

10. A method for transmitting data across an isolation barrier, comprising:
coupling a first energy storage device to a power source;
supplying power to a control system using the first energy storage device;
providing a data signal to the control system; and
responsive to at least one control signal generated by the control system, selectively coupling a second energy storage device to the power source via at least one charge switch and selectively coupling the second energy storage device to a primary coil of an electrically isolating energy transfer device via at least one dumping switch so as to transmit energy from the second energy storage device to a secondary side of the electrically isolating energy transfer device that corresponds to the data signal.

11. The method of claim 10, wherein selectively coupling the second energy storage device to a power source includes charging a plurality of capacitors in the second energy storage device.

12. The method of claim 10, further comprising coupling the second energy storage device to the power source during a charge phase and coupling the second energy storage device to the primary coil of the electrically isolating energy transfer device during a dump phase.

13. The method of claim 10, further comprising charging the second energy storage device to a power supply voltage.

14. The method of claim 10, further comprising charging the second energy storage device to a control signal voltage.

15. The method of claim 12, further comprising selectively coupling the second energy storage device to the primary coil of the electrically isolating energy transfer device during the dump phase in a bi-polar manner.

16. The method of claim 12, further comprising selectively coupling the second energy storage device to the power source during the charge phase in a bi-polar manner.

17. The circuit of claim 5, wherein:
the coupling system comprises a plurality of charge switches coupled between the second energy storage device and the power source to selectively couple and decouple the second energy storage device to and from the power source, and a plurality of dumping switches coupled between the second energy storage device and the primary coil of the energy transfer device to selectively couple and decouple the second energy storage device to and from the primary coil; and
the control system is configured to close at least one of the charge switches and open the plurality of dumping switches during the charge phase, and to open the plurality of charge switches and close at least one of the dumping switches during the dump phase.

18. The circuit of claim 17, wherein the plurality of dump switches has at least two switch configurations, in a first switch configuration coupling the second energy storage device to the primary coil in a first orientation, and in a second switch configuration coupling the second energy storage device to the primary coil in a second orientation.

19. The method of claim 12, wherein during the dump phase coupling a first terminal of the second energy storage device to a terminal of the primary coil in a first state and coupling a second terminal of the second energy storage device to the terminal of the primary coil in a second state.

20. A circuit for transmitting data across an isolation barrier, comprising:
an electrically isolating energy transfer device separating a primary side and a secondary side and including a primary coil, the primary side including:
a first means for coupling a first energy storage device to a power source;
a second means for supplying power to a control system using the first energy storage device, the control system being configured to receive a data signal;
a third means for selectively coupling a second energy storage device to the power source, and
a fourth means for selectively coupling the second energy storage device to the primary coil of the electrically isolating energy transfer device
wherein the control system is configured to control the third and fourth means such that energy is selectively transmitted from the second energy storage device to the secondary side that corresponds to the data signal.

21. The circuit of claim 20, wherein the third means comprises a plurality of charge switches coupled between the second energy storage device and the power source to selectively couple and decouple the second energy storage device to and from the power source, and the fourth means comprises a plurality of dumping switches coupled between the second energy storage device and the primary coil of the energy transfer device to selectively couple and decouple the second energy storage device to and from the primary coil; and
the control system is configured to close at least one of the charge switches and open the plurality of dumping switches during the charge phase, and to open the plurality of charge switches and close at least one of the dumping switches during the dump phase.

22. The circuit of claim 21, wherein the plurality of dumping switches has at least two switch configurations, in a first switch configuration coupling the second energy storage device to the primary coil in a first orientation, and in a second switch configuration coupling the second energy storage device to the primary coil in a second orientation.

* * * * *

UNITED STATES PATENT AND TRADEMARK OFFICE
CERTIFICATE OF CORRECTION

PATENT NO. : 9,583,948 B2
APPLICATION NO. : 13/662100
DATED : February 28, 2017
INVENTOR(S) : Michael Mueck et al.

Page 1 of 1

It is certified that error appears in the above-identified patent and that said Letters Patent is hereby corrected as shown below:

In the Claims

In Claim 20, at Column 12, Line 26, delete "energy transfer device" and replace it with --energy transfer device,--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*